United States Patent
Ribeiro et al.

(10) Patent No.: US 10,250,364 B2
(45) Date of Patent: Apr. 2, 2019

(54) CHANNEL MEASUREMENTS SUPPORTING COORDINATED MULTI-POINT OPERATION

(75) Inventors: Cássio Barboza Ribeiro, Espoo (FI); Pekka Markus Nikolai Janis, Espoo (FI); Klaus Hugl, Vienna (AT)

(73) Assignee: Nokia Corporation, Espoo (FI)

( * ) Notice: Subject to any disclaimer, the term of this patent is extended or adjusted under 35 U.S.C. 154(b) by 150 days.

(21) Appl. No.: 13/315,529

(22) Filed: Dec. 9, 2011

(65) Prior Publication Data

US 2013/0148515 A1 Jun. 13, 2013

(51) Int. Cl.
*H04L 5/00* (2006.01)
*H04B 7/024* (2017.01)
*H04B 7/06* (2006.01)

(52) U.S. Cl.
CPC .......... *H04L 5/0048* (2013.01); *H04L 5/0094* (2013.01); *H04B 7/024* (2013.01); *H04B 7/0626* (2013.01); *H04L 5/0066* (2013.01); *Y02D 70/1262* (2018.01); *Y02D 70/1264* (2018.01); *Y02D 70/442* (2018.01); *Y02D 70/444* (2018.01)

(58) Field of Classification Search
CPC .............................. H04W 24/10; H04W 72/08
See application file for complete search history.

(56) References Cited

U.S. PATENT DOCUMENTS

2007/0140168 A1* 6/2007 Laroia et al. ................. 370/330
2007/0259672 A1* 11/2007 Heo et al. .................. 455/452.2
2010/0322351 A1  12/2010 Tang et al. ..................... 375/316
2011/0199986 A1*  8/2011 Fong et al. ..................... 370/329
2012/0020230 A1*  1/2012 Chen ..................... H04L 1/0028
                                                              370/252
2012/0076040 A1*  3/2012 Hoshino et al. ............... 370/252
2013/0040673 A1*  2/2013 Siomina et al. .............. 455/501

FOREIGN PATENT DOCUMENTS

| WO | WO-2011/022733 A2 | 12/2010 |
| WO | WO-2011/022733 A2 | 2/2011 |
| WO | WO-2011/079811 A | 7/2011 |
| WO | WO-2011/100520 A1 | 8/2011 |
| WO | WO-2011/115421 A2 | 9/2011 |

OTHER PUBLICATIONS

"CoMP simulation assumptions", NTT DOCOMO, TSG-RAN WG1 #63bis, R1-110603, Jan. 2011, 4 pgs.

(Continued)

*Primary Examiner* — James P Duffy
(74) *Attorney, Agent, or Firm* — Harrington & Smith

(57) ABSTRACT

An aspect of this invention is a definition of a set of reused channel state information reference signal (CSI-RS) resources among transmission points, which can be lower power nodes, for intra-cell coordinated multi-point (CoMP) operation. Separate CSI-RS resources are defined for each transmission point for sporadic separate measurements to be made by user equipment. The sporadic measurements may be implemented with low additional overhead, and are used for generating potentially simplified CSI feedback to an evolved NodeB that enables adapting shared channel reuse and also potentially making related channel quality indicator (CQI) compensation.

23 Claims, 9 Drawing Sheets

(56) References Cited

OTHER PUBLICATIONS

"Revised SID Proposal: Coordinated Multi-Point Operation for LTE", Samsung, 3GPP TSG RAN#50, RP-101425, Dec. 2010, 6 pgs.
"Baseline Schemes and Focus of CoMP Studies", Ericsson, 3GPP TSG-RAN WG1 #63-bis, R1-110461, Jan. 2011, 2 pgs.
"Downlink CSI Feedback for Low-Power Nodes", Research in Motion, UK Limited, 3GPP TSG RAN WG1 Meeting #65, R1-111662, May 2011, 6 pgs.
"CSI-RS configuration and signalling", Huawei, HiSilicon, 3GPP TSG RAN WG1 Meeting #66bis, R1-112902, Oct. 2011, 3 pgs.
"CSI Reference Signal Designs for Enabling Closed-Loop MIMO Feedback", Timothy A. Thomas, et al., IEEE 2010, 5 pgs.
"3$^{rd}$ Generation Partnership Project; Technical Specification Group Radio Access Network; Coordinated multi-point operation for LTE physical layer aspects (Release 11)", 3GPP TR 36.819 V11.0.0, Sep. 2011, 68 pgs.
"Coordinated Multi-Point Operation for LTE", 3GPP Work Item Description, RP-111365, Sep. 2011, 5 pgs.
"Reference Signal Port Discovery Involving Transmission Points", Klaus Hugl, U.S. Appl. No. 13/066,227, filed Apr. 8, 2011, 41 pgs.
"3$^{rd}$ Generation Partnership Project; Technical Specification group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.5.0, Sep. 2011, 194 pgs.
"3$^{rd}$ Generation Partnership Project; Technical Specification Group Radio Access Network; Evolved Universal Terrestrial Radio Access (E-UTRA); Physical Channels and Modulation (Release 10)", 3GPP TS 36.211 V10.3.0, Sep. 2011, 103 pgs.
"3$^{rd}$ Generation Partnership Project; Technical Specification Group Radio Access Network; Feasibility study for Further Advancements for E-UTRA (LTE-Advanced) (Release 10)", 3GPP TR 36.912 V10.0.0, Mar. 2011, 62 pgs.
"3$^{rd}$ Generation Partnership Project; Technical Specification Group Radio Access Network; Requirements for further advancements for Evolved Universal Terrestrial Radio Access (E-UTRA) (LTE-Advanced) (Release 10)", 3GPP TR 36.913 V10.0.0, Mar. 2011, 15 pgs.
Samsung, Discussion on the Specification Impact of CoMP, 3GPP R1-112512, 3GPP, Aug. 22, 2011.
Hitachi Ltd., Consideration on Aggregated CSI Feedback, 3GPP R1-113968, 3GPP, Nov. 14, 2011.
Huawei et al. *Consideration on CSI-RS Configuration* 3GPP Draft; R2-111555/R1-111156, vol. RAN WG2, No. 73, Feb. 21, 2011,- Nov. 25, 2011, XP050493873, Taipei, Taiwan.
Huawei et al. *Framework for Multi-Point CSI Feedback enhancements for CoMP* 3GPP Draft; R1-112896, vol. RAN WG1, No. 66bis, Oct. 10, 2011,-Oct. 20, 2011, XP050538109, Zhuhai.

* cited by examiner

TABLE 1: CSI-RS RESOURCES AS A FUNCTION OF TIME. IN THE EXEMPLARY TIME INSTANTS t2 AND t6 (WITH CONFIGURABLE PERIODICITY), THE CSI-RS RESOURCES ARE CONFIGURED FOR EXPANDED CSI MEASUREMENTS, SUCH THAT INDEPENDENT MEASUREMENTS FROM DIFFERENT LPNs ARE POSSIBLE

| Node  | $t_0$ | $t_1$ | $t_2$ | $t_3$ | $t_4$ | $t_5$ | $t_6$ |
|-------|-------|-------|-------|-------|-------|-------|-------|
| MACRO | #0    | #0    | #0    | #0    | #0    | #0    | #0    |
| LPN1  | #1    | #1    | #1    | #1    | #1    | #1    | #1    |
| LPN2  | #1    | #1    | #2    | #1    | #1    | #1    | #2    |
| LPN3  | #1    | #1    | #3    | #1    | #1    | #1    | #3    |
| LPN4  | #1    | #1    | #4    | #1    | #1    | #1    | #4    |

TABLE 2: CSI-RS RESOURCES AS A FUNCTION OF TIME. IN THE EXEMPLARY TIME INSTANTS t2 AND t6, THE CSI-RS RESOURCES ARE CONFIGURED FOR EXPANDED CSI MEASUREMENTS, SUCH THAT INDEPENDENT MEASUREMENTS FROM DIFFERENT LPNs ARE POSSIBLE. DURING THE EXPANDED CSI MEASUREMENTS ALSO THE SHARED CSI-RS RESOURCES ARE STILL ACTIVE

| Node  | $t_0$ | $t_1$ | $t_2$   | $t_3$ | $t_4$ | $t_5$ | $t_6$   |
|-------|-------|-------|---------|-------|-------|-------|---------|
| MACRO | #0    | #0    | #0      | #0    | #0    | #0    | #0      |
| LPN1  | #1    | #1    | #1, #2  | #1    | #1    | #1    | #1, #2  |
| LPN2  | #1    | #1    | #1, #3  | #1    | #1    | #1    | #1, #3  |
| LPN3  | #1    | #1    | #1, #4  | #1    | #1    | #1    | #1, #4  |
| LPN4  | #1    | #1    | #1, #5  | #1    | #1    | #1    | #1, #5  |

| CSI-RS RESOURCE# | 0 | 1 | 2 | 3 | 4 | 5 | 6 | 7 | 8 | 9 | 20 | 21 | 22 | 23 | 24 | 25 |
|---|---|---|---|---|---|---|---|---|---|---|---|---|---|---|---|---|
| EXPANDED CSI-RS RESOURCE BITMAP | 1 | 1 | 1 | 1 | 1 | 0 | 0 | 0 | 0 | 0 | 0 | 0 | 0 | 0 | 0 | 0 |

MACRO LPN1 LPN2 LPN3 LPN4

CSI-RS RESOURCES APPLICABLE FOR TDD ONLY

FIG.5B

| CSI-RS RESOURCE# | 0 | 1 | 2 | 3 | 4 | 5 | 6 | 7 | 8 | 9 | 20 | 21 | 22 | 23 | 24 | 25 |
|---|---|---|---|---|---|---|---|---|---|---|---|---|---|---|---|---|
| EXPANDED CSI-RS RESOURCE BITMAP | 0 | 0 | 1 | 1 | 1 | 1 | 0 | 0 | 0 | 0 | 0 | 0 | 0 | 0 | 0 | 0 |

LPN1 LPN2 LPN3 LPN4

CSI-RS RESOURCES APPLICABLE FOR TDD ONLY

CHANNEL MEASUREMENTS SUPPORTING COORDINATED MULTI-POINT OPERATION

TECHNICAL FIELD

The exemplary and non-limiting embodiments of this invention relate generally to wireless communication systems, methods, devices and computer programs and, more specifically, relate to coordinated multi-point (CoMP) operation, including intra-cell CoMP.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
CQI channel quality indicator
CSI channel state information
CSI-RS channel state information reference signal
DL downlink (eNB towards UE)
eNB E-UTRAN Node B (evolved Node B)
EPC evolved packet core
E-UTRAN evolved UTRAN (LTE)
FDMA frequency division multiple access
HSPA high speed packet access
IMTA international mobile telecommunications association
ITU-R international telecommunication union-radiocommunication sector
LPN low power node
LTE long term evolution of UTRAN (E-UTRAN)
LTE-A LTE advanced
MAC medium access control (layer 2, L2)
MIMO multiple input multiple output
MM/MME mobility management/mobility management entity
NodeB base station
OFDMA orthogonal frequency division multiple access
O&M operations and maintenance
PDCP packet data convergence protocol
PHY physical (layer 1, L1)
PMI precoding matrix indicator
PDSCH physical downlink shared channel
PUCCH physical uplink control channel
PUSCH physical uplink shared channel
Rel release
RI rank indicator
RLC radio link control
RRC radio resource control
RRH remote radio head
RRM radio resource management
RS reference signal
RSRP reference signal received power
RSRQ reference signal received quality
SGW serving gateway
SINR signal to interference plus noise ratio
SRS sounding reference signal
SC-I-DMA single carrier, frequency division multiple access
UE user equipment, such as a mobile station, mobile node or mobile terminal
UL uplink (UE towards eNB)
UPE user plane entity
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300 V10.5.0 (2011-09) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) incorporated by reference herein in its entirety and referred to for simplicity hereafter as 3GPP TS 36.300.

FIG. 1A reproduces a diagram from 3GPP TS 36.300 and shows the overall architecture of the E-UTRAN system (Rel-8). The E-UTRAN system includes eNBs, providing the E-UTRAN user plane (PDCP/RLC/MAC/PHY) and control plane (RRC) protocol terminations towards the UEs. The eNBs are interconnected with each other by means of an X2 interface. The eNBs are also connected by means of an S1 interface to an EPC, more specifically to a MME by means of a S1 MME interface and to a S-GW by means of a S1 interface (MME/S-GW 4). The S1 interface supports a many-to-many relationship between MMEs/S-GWs/UPEs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are further releases of 3GPP LTE (e.g., LIE Rel-10) targeted towards future IMT-A systems, referred to herein for convenience simply as LTE-Advanced (LTE-A).

Reference in this regard may be made to 3GPP TR 36.913 V10.0.0 (2011-03) Technical Report 3rd Generation Partnership Project; Technical Specification Group Radio Access Network; Requirements for further advancements for Evolved Universal Terrestrial Radio Access (E-UTRA) (LIE-Advanced)(Release 10). Reference can also be made to 3GPP TR 36.912 V10.0.0 (2011-03) Technical Report 3rd Generation Partnership Project; Technical Specification Group Radio Access Network; Feasibility study for Further Advancements for E-UTRA (LTE-Advanced) (Release 10).

A goal of LTE-A is to provide significantly enhanced services by means of higher data rates and lower latency with reduced cost. LIE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

Uplink and downlink frames (of 10 msec duration) are defined in 3GPP TS 36.211 V 10.3.0 (2011-09) Technical Specification 3rd Generation Partnership Project; Technical Specification Group Radio Access Network; Evolved Universal Terrestrial Radio Access (E-UTRA); Physical Channels and Modulation (Release 10). FIG. 1B reproduces a diagram from 3GPP: Downlink resource grid, of 3GPP TS 36.211 and shows the relationship of OFDM symbols, subcarriers, resource blocks and resource elements.

Coordinated Multipoint (CoMP) transmission and reception is one of the investigated technologies in 3GPP LTE-A to enhance specifically cell-edge data rates in order to create a more uniform data rate experience for the end-user over the entire cell area. The CoMP techniques involve increased collaboration between different BS nodes in DL transmission to the UE and UL reception from the UE.

Reference in this regard can be made to 3GPP TR 36.819 V11.0.0 (2011-09) *Technical Report* 3rd Generation Partnership Project; Technical Specification Group Radio Access Network; Coordinated multi-point operation for LTE physical layer aspects (Release 11).

Reference can also be made to 3GPP RP-111365, 3GPP Work Item Description: Coordinated Multi-Point Operation for LTE, September 2011.

One scenario relates to a CoMP solution focusing on a heterogeneous network involving the collaboration/cooperation between a macro eNB with high transmission power and lower power eNBs within the macro-eNB coverage area. Specifically, one target scenario assumes a technique using the same cell-ID for all the eNBs/network nodes within the macro-eNB coverage area, which can be referred to as "Intra-cell CoMP". Reference in this regard can be made to R1-110603, CoMP simulation assumptions, January 2011.

SUMMARY

In a first aspect thereof the exemplary embodiments of this invention provide a method that comprises assigning a first set of channel state information reference signal resources to individual ones of a plurality of transmission points and assigning a second set of channel state information reference signal resources to individual ones of the plurality of transmission points, where the first set is smaller than the second set; signaling information that describes the first and second sets of the channel state information reference signal resources to a user equipment; and receiving a channel state information report from the user equipment, the channel state information report comprising information that describes a measurement made by the user equipment of at least one of the transmission points using at least the second set of channel state information reference signal resources.

In another aspect thereof the exemplary embodiments of this invention provide an apparatus that comprises at least one data processor and at least one memory including computer program code. The at least one memory and computer program code are configured, with the at least one data processor, to cause the apparatus at least to assign a first set of channel state information reference signal resources to individual ones of a plurality of transmission points and to assign a second set of channel state information reference signal resources to individual ones of the plurality of transmission points, where the first set is smaller than the second set; to signal information that describes the first and second sets of the channel state information reference signal resources to a user equipment; and to receive a channel state information report from the user equipment, the channel state information report comprising information descriptive of a measurement made by the user equipment of at least one of the transmission points using at least the second set of channel state information reference signal resources.

In yet another aspect thereof the exemplary embodiments of this invention provide a method that comprises receiving at a user equipment signaling information that is descriptive of a first set of channel state information reference signal resources assigned to individual ones of a plurality of transmission points and a second set of channel state information reference signal resources assigned to individual ones of the plurality of transmission points, where the first set is smaller than the second set; making a measurement of at least one transmission point using at least the second set of channel state information reference signal resources; and transmitting a channel state information report from the user equipment, where the channel state information report comprises information that describes the measurement made by the user equipment of at least one of the transmission points using at least the second set of channel state information reference signal resources.

In one still further aspect thereof the exemplary embodiments of this invention provide an apparatus that comprises at least one data processor and at least one memory including computer program code. The at least one memory and computer program code are configured, with the at least one data processor, to cause the apparatus at least to receive at a user equipment signaling information that is descriptive of a first set of channel state information reference signal resources assigned to individual ones of a plurality of transmission points and a second set of channel state information reference signal resources assigned to individual ones of the plurality of transmission points, where the first set is smaller than the second set; to make a measurement of at least one transmission point using at least the second set of channel state information reference signal resources; and to transmit a channel state information report from the user equipment, the channel state information report comprising information that describes the measurement made by the user equipment of at least one of the transmission points using at least the second set of channel state information reference signal resources.

BRIEF DESCRIPTION OF THE DRAWINGS

In the attached Drawing Figures:

FIG. 4 illustrates two tables. Table 1 depicts CSI-RS port configurations as a function of time. In the example time instants t2 and t6 (with configurable periodicity), the CSI-RS ports are configured for expanded CSI measurements as described in detail below, such that independent measurements from different LPNs are possible. Table 2 also depicts CSI-RS port configurations as a function of time. In the example time instants t2 and t6, the CSI-RS ports are configured for expanded CSI measurements, such that independent measurements from different LPNs are possible. During the expanded CSI port configurations the shared CSI-RS configuration is still active.

FIGS. 5A and 5B, collectively referred to as FIG. 5, show a basic principle of an expanded CSI-RS resource bitmap, where FIG. 5A relates to the Table 1 in FIG. 4 and FIG. 5B relates to the additional configured CSI-RS resources of Table 2 in FIG. 4.

FIG. 6A shows a conventional message flow in accordance with LTE Rel-10/11 operation, while FIG. 6B shows a message flow in accordance with measurement configurations and reporting in accordance with this invention.

DETAILED DESCRIPTION

The exemplary embodiments of this invention relate to DL CoMP operation in general, and more specifically relate to a single-cell operation mode of Coordinated Multipoint reception and transmission (RX and TX).

Figure 2:
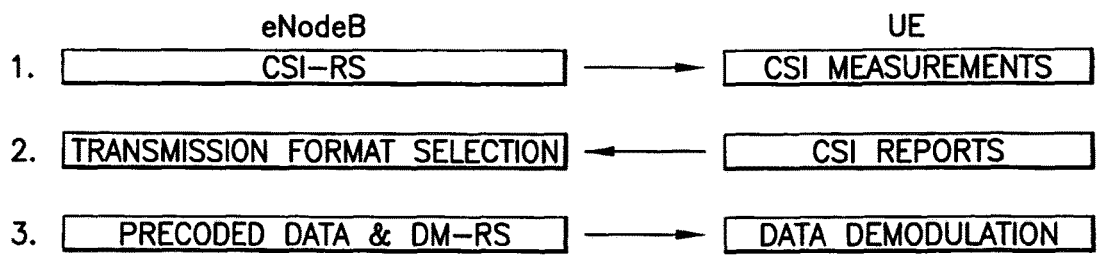
FIG. 2 shows a basic procedure of data transmission utilizing CSI-RS.
Figure 1B:
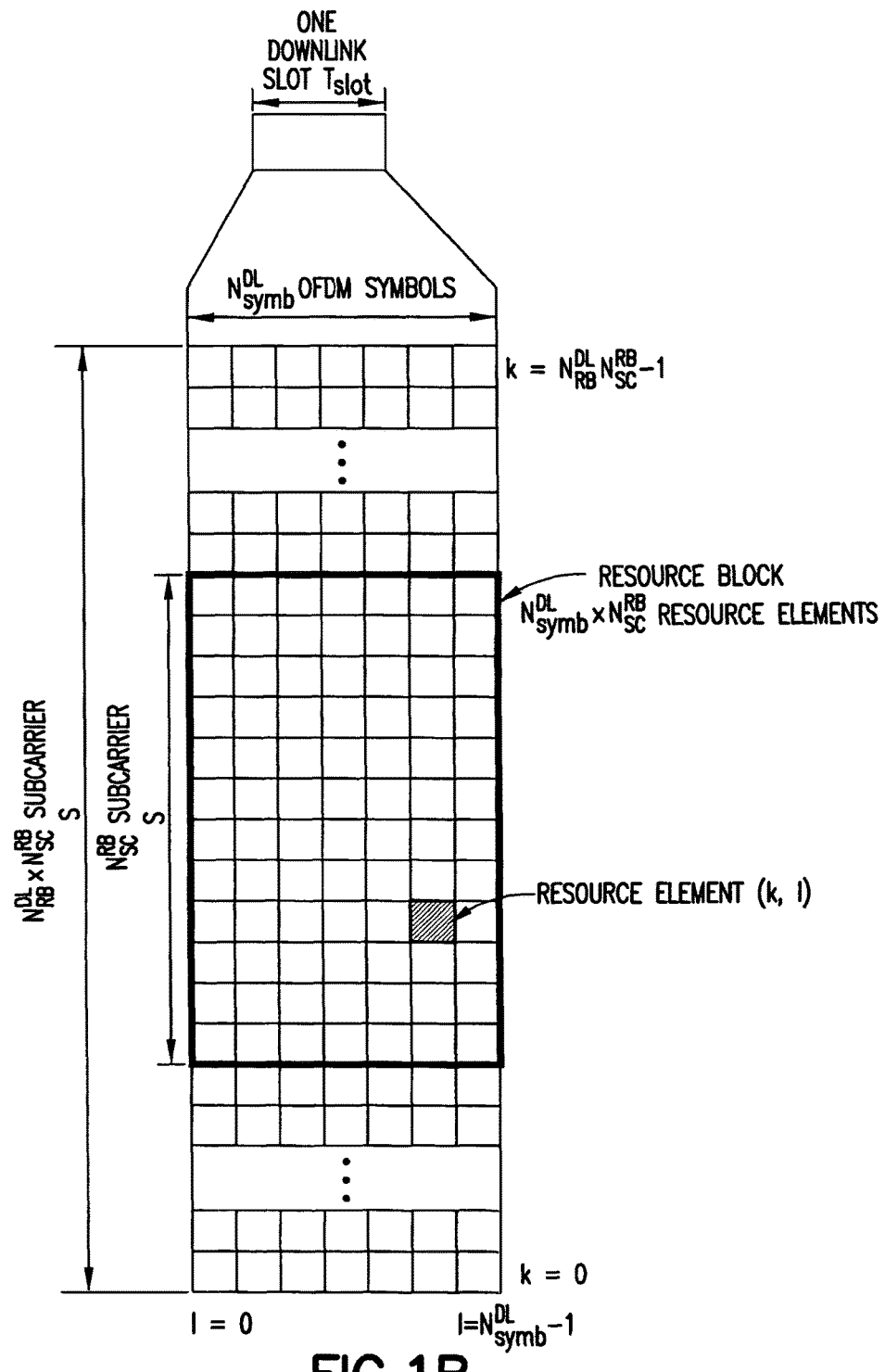
FIG. 1B reproduces a diagram from 3GPP: Downlink resource grid, of 3GPP TS 36.211 and shows the relationship of OFDM symbols, subcarriers, resource blocks and resource elements.

In LTE Release-10 one new feature is the introduction of CSI-RS (Channel State Information-Reference Signals). The goal is to transmit separate RS for CSI estimation purposes in some selected (particular) subframes with, e.g., 5 ms or 10 ms periodicity. The UE estimates the CSI based upon the CSI-RS, which are configured to be used by the UE, and transmits the CSI feedback to the eNB, which in turn can use the CSI in its scheduling decisions as well as for the selection of a proper transmission format (including, e.g., transmission rank, precoder, transport block size, and other needed parameters) for the data. The data in DL transmission mode 9 (TM9) is transmitted together with user specific (dedicated) demodulation reference symbols (DM-RS), spanning the same physical resource blocks as the data for that UE. The same precoding is applied for the DM-RS and the data. This allows for the usage of any precoding by the eNB, as the actually-used precoding is transparent to the UEs and does not need to be signaled to the UEs. FIG. 2 shows a basic procedure of data transmission utilizing CSI-RS.

In addition to the CSI-RS transmission intended for the UE, LTE Rel-10 also provides a possibility to configure other CSI-RS patterns with zero transmit power (i.e., muted patterns, indicating which of the resource elements the eNB will leave empty when transmitting data on the PDSCH). This allows for reducing the interference towards CSI-RS in neighbouring cells as well as providing for future evolution of the CSI-RS design, so that a Rel-11 UE can, e.g., measure CSI-RS from multiple cells and/or multiple CSI-RS configurations simultaneously without PDSCH interference (a feature not yet included in LTE Rel-10).

The following definitions will be used in the ensuing description of the embodiments of this invention.

CSI-RS port: resource elements (REs) where there is a transmission of a CSI-RS sequence from a given antenna port in a given transmission point.

CSI-RS resource: a set of CSI-RS ports (1, 2, 4 or 8 ports) and a respective sequence that is configured for a UE to measure and report as one combined set, i.e., the UE may assume that all CSI-RS ports within the CSI-RS resource are to be treated jointly creating a single, combined CSI report (RI, PMI & CQI) for all of the ports within the CSI-RS resource.

CSI-RS muting (zero transmit power) pattern: a bitmap that identifies sets of CSI-RS ports which are assumed to be muted in the PDSCH transmission to the UE.

Figure 3:
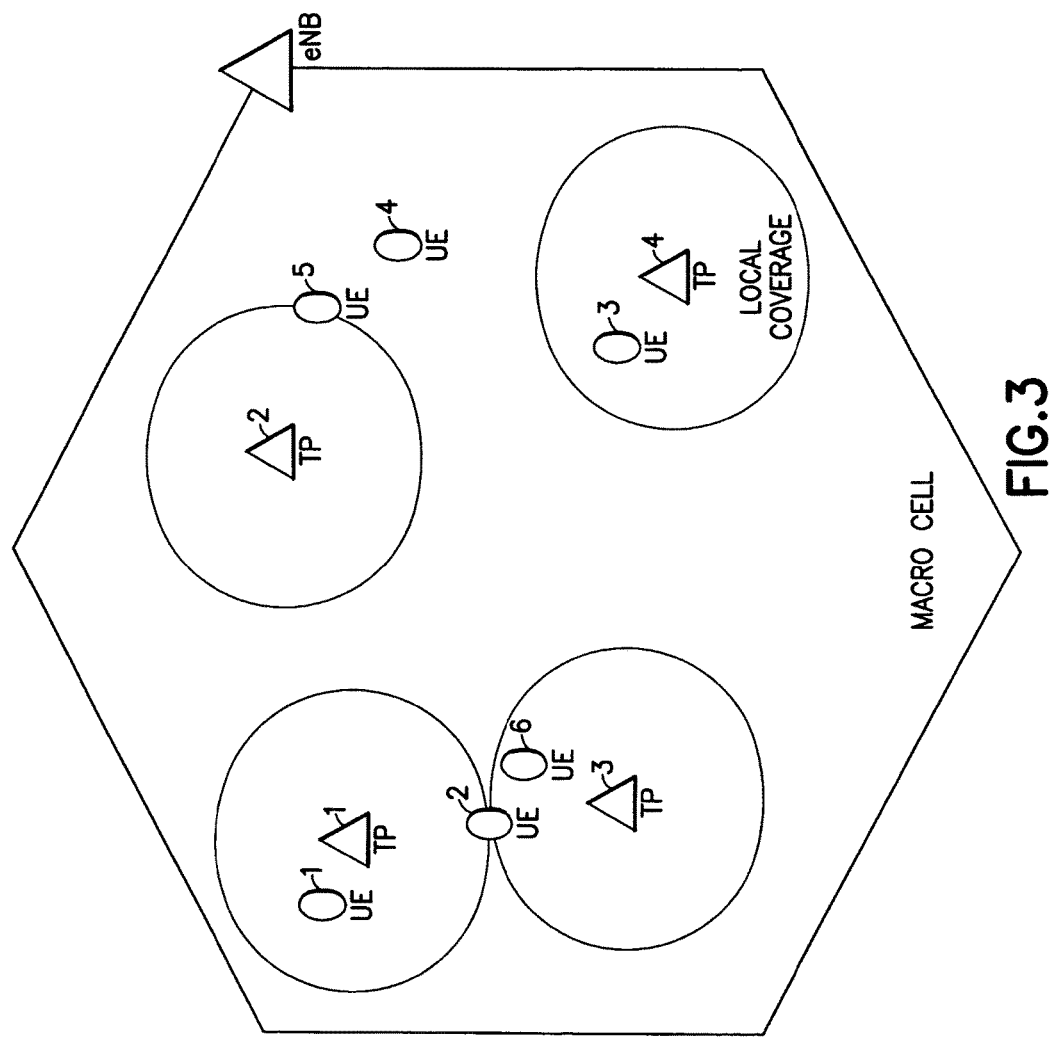
FIG. 3 shows an example of a network deployment scenario with four pico transmission nodes within the coverage area of one macro cell.

One example of a network deployment scenario of interest herein is depicted in FIG. 3. Within the coverage area of one macro eNB with, e.g., 4 TX antennas there are altogether four picocell type of hotspots, each having some number (e.g., 1, 2, or 4) of transmit antennas and a respective number of CSI-RS ports configured.

The picocell transmission nodes (having lower TX power as compared to the macro transmission node, and therefore denoted as low power nodes (LPNs)) may or may not have the same Cell ID as the macro transmission node. In the conventional heterogeneous networks scenario the picocell nodes/LPNs are cells of their own, each having a distinct Cell ID. However, in the case of intra-cell CoMP several transmission nodes, such as Remote Radio Heads (RRHs) (possibly having different transmission powers), share the same physical Cell-ID and can only to be distinguished by different CSI-RS resources. Transmission nodes with the same Cell-ID are referred to as transmission points (TPs) of the cell. FIG. 3 shows a non-limiting example of four TPs, TP1-TP4.

For the case of intra-cell CoMP several alternatives indicated below, in addition to others, exist for the definition of CSI-RS resources for each of the transmission points in the cell.

(A) A first alternative is to use different CSI-RS resources in all transmission points.

(B) Another alternative is to reuse the same CSI-RS resource for all TPs (including the macro node). Note that the reuse of the same set of CSI-RS resources is also possible in the case of a different number of TX antennas in the different TPs (the total number of ports is then given by the largest number of TX antennas of all the TPs within the cell).

(C) Another alternative is to reuse a CSI-RS resource for all LPNs, which is different than the CSI-RS resource used by macro node.

The alternative (A) above is the most flexible from the point of view of implementing different CoMP schemes, as the mechanisms of CSI-RS resource configuration described above can be used to arrange independent measurements of channels from different transmission points. However, such a configuration implies maximum CSI-RS overhead to the PDSCH transmission, while it is clear from FIG. 3 that most UEs are not able to effectively combine signals from the many transmission points that are distributed over the cell. Moreover, in order to support more sophisticated CoMP schemes, such as joint transmission (simultaneous transmission to the UE from multiple transmission points), the individual measurements should be combined at the eNB. This would imply however an inherent loss. In addition, constantly monitoring and reporting the CSI for all of the configured CSI-RS resources would imply high measurement overhead and reporting overhead for the UE and, therefore, from network point of view a high UL control channel overhead.

Alternative B above is the simplest configuration as no muting patterns are required for the purpose of intra-cell operation, and the measurement overhead is minimal. However, this alternative implies a limitation on the supported modes of operation in the system. Essentially, from the CSI reporting point of view it implies joint transmission from all TPs in the cell. However, the reuse of the PDSCH (by multi-user spatial multiplexing) is possible for those UEs that are as an example in the core areas of LPNs, as the contribution from macro and other LPNs would be reduced in that case.

Alternative C above provides a good trade-off between CSI-RS overhead and flexibility for reuse of the PDSCH within the cell. CSI for coherent joint transmission is supported between LPNs enabled with single CSI feedback for the shared CSI-RS resource. There are also independent CSI measurements with the macro node having a separate CSI-RS resource and, hence, a flexible coordination between LPNs and the macro node is supported. Moreover, from FIG. 3 it is evident that for many UEs there is not much benefit of being able to measure frequently the channels from several different LPNs separately, as most UEs are typically only observing relevant channels from the macro eNB and one LPN. In any case, there are UEs that benefit from CoMP transmission from two or more LPNs, as for example the UE2 located between TP1 and TP3 in FIG. 3.

One problem with the approach of Alternative C is that in case the PDSCH is reused in different LPNs, the CSI measurements will not be accurate. For example, if TP1 and TP3 in FIG. 3 are transmitting a separate PDSCH for different users, then UE6 under TP3 will measure a PMI and CQI distorted by the same CSI-RS transmission from TP1. The PMI is quantized to a relatively small codebook and, hence, the small disturbance by TP1 would not necessarily affect the PMI selection and therefore would not necessarily result in any performance degradation. However, fluctuations in CQI can be relatively large, as some links (in this case TP1) that were previously considered as contributing to the signal have to be considered instead as representing interference.

It is therefore advantageous that the UE would only regularly report the CSI for the ports that are configured in the system for regular CSI feedback, but that it also should be able to provide information to the eNB regarding the relative received powers from different transmission points. With this information the eNB is able to at least decide whether to reuse the PDSCH in different LPNs, and also apply a CQI correction removing the distortion explained above after each scheduling decision.

The embodiments of this invention provide a solution to these problems by the use of an enhanced CSI-RS resource configuration at the UE.

It is noted that single-cell ID/Intra-cell CoMP operation has been introduced/suggested to the 3GPP community during the RAN1#63bis meeting (see R1-110461, Baseline Schemes and Focus of CoMP Studies, January 2011). The operation and definitions of feedback of channel state information (CSI) have not yet been resolved.

Figure 7:
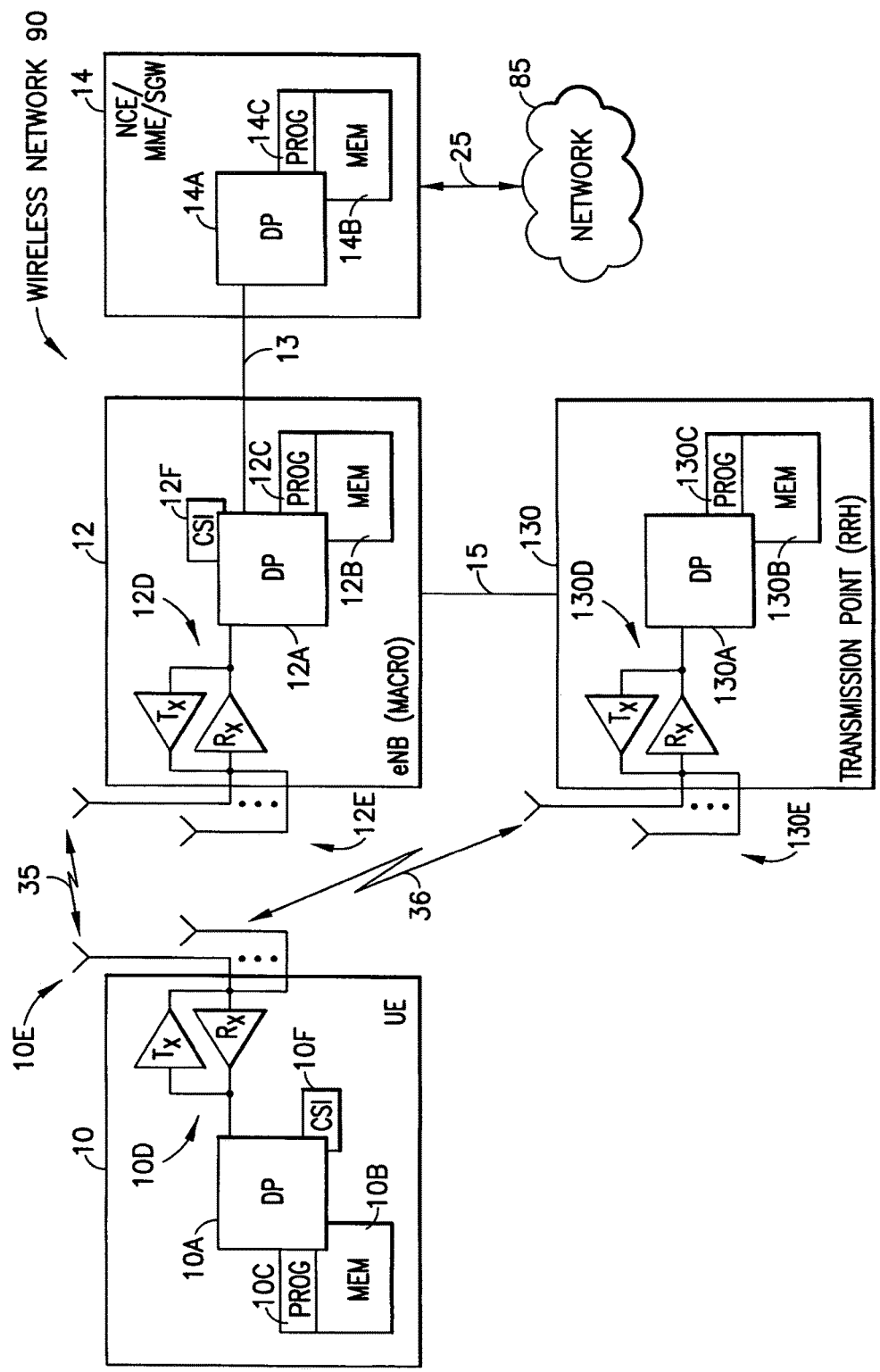
FIG. 7 shows a simplified block diagram of various electronic devices that are suitable for use in practicing the exemplary embodiments of this invention.

Before describing in further detail the exemplary embodiments of this invention, reference is made to FIG. 7 for illustrating a simplified block diagram of various apparatus that are suitable for use in practicing the exemplary embodiments of this invention. In FIG. 7 a wireless network 90 includes an eNB 12, an NCE/MME/SGW 14, and a transmission point such as RRH 130. In a typical case, and as is shown in FIG. 3, there can be several transmission points, such as the RRH 130, present within the macro cell coverage area associated with the eNB 12 (the macro eNB).

The wireless network 90 is adapted for communication over a wireless link 35 and 36 with an apparatus, such as a mobile communication device which may be referred to as a UE 10, via a network access node, such as a Node B (base station), and more specifically an eNB 12 as well as RRH 130. The network 90 may include a network control element (NCE) 14 that may include the MME/SGW functionality, and which provides connectivity with a further network, such as a telephone network and/or a data communications network 85 (e.g., the internet) through link 25. The NCE 14 includes a controller, such as at least one computer or a data processor (DP) 14A, and at least one non-transitory computer-readable memory medium embodied as a memory (MEM) 14B that stores a program of computer instructions (PROG) 14C.

The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter/receiver pair (transceiver) 10D for bidirectional wireless communications with the eNB 12 and/or RRH 130 via one or more antennas 10E. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 12E (typically several when multiple input, multiple output (MIMO) operation is in use).

Figure 1A:
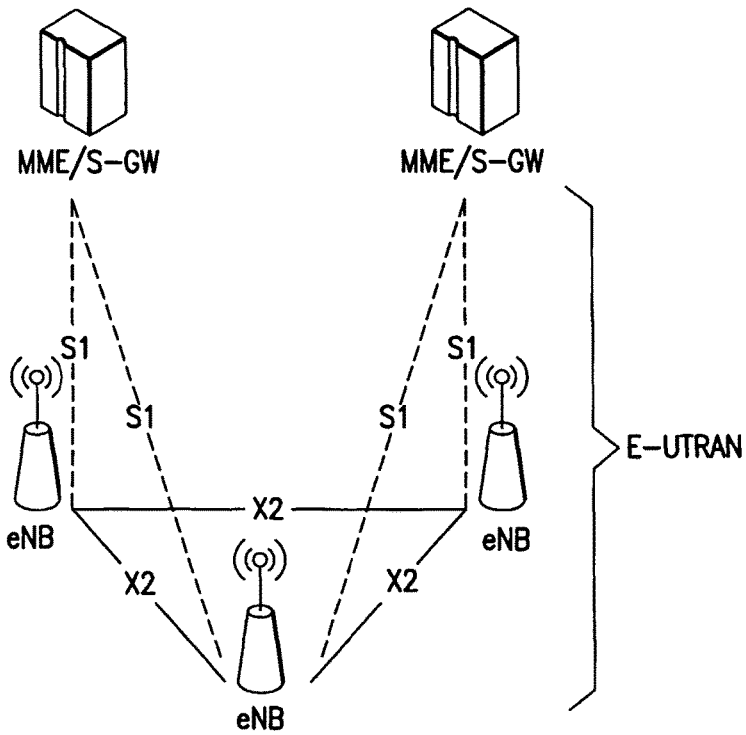
FIG. 1A reproduces a diagram from 3GPP TS 36.300, and shows the overall architecture of the E-UTRAN system.

The eNB 12 is coupled via a data and control path 13 to the NCE 14. The path 13 may be implemented as an Si interface as shown in FIG. 1A. The eNB 12 may also be coupled to at least one transmission point 130 via data and control path 15, which may be implemented as the X2 interface shown in FIG. 1A in the case of another logical base station, or it can be a direct eNodeB internal interface, e.g., optical fiber connection, to connect the at least one transmission, point such as radio remote head (RRH) 130, to the eNB 12. Typically the eNB 12 covers a single macro cell (shown in FIG. 3) via the one or more antennas 12E.

In this example at least one transmission point 130 includes a controller, such as at least one computer or a data processor (DP) 130A, at least one computer-readable memory medium embodied as a memory (MEM) 130B that stores a program of computer instructions (PROG) 130C, and at least one suitable RF transceiver 130D for communication with the UE 10 via one or more antennas 130E (as stated above, typically several when multiple input, multiple output (MIMO) operation is in use). The transmission point 130 communicates with the UE 10 via a wireless link 36. The transmission point 130 may communicate, depending on implementation, with the eNB 12 using the data and control path 15. The transmission point 130 can be another eNB or can be logically part of the eNB 12 as, e.g., enabled by a Radio Remote Head (RRH), and can create a local (hotspot) coverage area inside the macro cell coverage area of the eNB 12 (as shown in FIG. 3). For intra-cell COMP all of the transmission points 130 (see also FIG. 3) are under full control of the single eNB 12. Thus, there is centrally some unit where several transmission points/RRHs 130 are connected as such, with the goal being that the transmission points 130 and the macro eNB 12 are centrally controlled together. The control is typically at the location of the macro eNB 12, but could also be at a location that is connected to the eNB 12 and the transmission point 130.

The transmission point 130 can be considered in some embodiments as being an extension of the functionality of the eNB 12 that provides spatially distributed RF transmission and reception capabilities for the eNB 12. For example, in some embodiments the baseband processing of the transmission point 130 can be performed at the eNB 12.

For the purposes of describing the exemplary embodiments of this invention the UE 10 can be assumed to also include a CSI measurement and reporting unit (CSI) 10F, and the eNB 12 includes a CSI RS assignment and measurement receiving unit (CSI) 12F. The CSI units 10F and 12F are operated in accordance with the exemplary embodiments of this invention as described in further detail below.

At least one of the PROGs 10C, 12C and 130C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12 and/or by the DP 130A of the TP 130, or by hardware, or by a combination of software and hardware (and firmware).

The various data processors, memories, programs, transceivers and interfaces depicted in FIG. 7 can all be considered to represent means for performing operations and functions that implement the several non-limiting aspects and embodiments of this invention.

In general, the various embodiments of the UE 10 can include, but are not limited to, cellular mobile devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B, 12B, 14B and 130B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A, 12A, 14A and 130A may be of any type suitable to the local technical environment, and may include one or more of general purpose computers, special purpose computers, microprocessors, digital signal processors (DSPs) and processors based on multi-core processor architectures, as non-limiting examples.

The use of the exemplary embodiments of this invention ensures that the network/eNBs 12 can acquire sufficient information to reuse the PDSCH in intra-cell CoMP operation (when beneficial), and to also support joint transmission, while at the same time minimizing the CSI-RS overhead.

An aspect of this invention is to configure reused CSI-RS resources, as an example among LPNs in intra-cell CoMP, and define separate CSI-RS resources for each transmission point for sporadic separate measurements. The sporadic measurements may be implemented with low additional overhead, and are used for generating simplified CSI feedback reports that enables adapting the PDSCH reuse and also possibly making the related CQI compensation. The sporadic measurements are made less frequently than normal measurements of the CSI of the transmission nodes (Macro and LPNs).

One simple and non-limiting example of the principle of the invention is illustrated in Table 1 of FIG. 4. Assume there is one macro cell and four LPN hotspots LPN1-LPN4 (there could be more or less than four LPNs present). Assume further that each LPN is assigned CSI-RS resource #1, which is the same for all LPNs, while the macro eNB 12 is assigned CSI-RS resource #0. The respective configurations are signaled to the UEs 10 of interest. The UEs 10 may also be signaled a muting pattern corresponding to the CSI-RS resources within the cell or neighboring cells. In accordance with this invention a secondary pattern or set of patterns is defined to indicate the configuration for expanded CSI, similar to Alternative A, where each TP has a separate CSI-RS resource to be used for the expanded CSI measurements (for time instants t2 and t6 in Table 1).

This secondary pattern avoids the need to reconfigure the UE-specific CSI-RS in the cell each time there is a change between compact (low-overhead) and expanded (full-overhead) CSI-RS measurements. Instead, the eNB 12 can send a cell-specific notification that the secondary pattern will be used in a given subframe, which then serves as a trigger for the expanded CSI measurements.

The expanded CSI-RS measurement configuration and CSI measurements at the time instants t2 and t6 in Table 1 could be implemented in at least two different ways.

(A.1) In a first technique (signaling technique A.1) the UE 10 is signaled the CSI-RS resources #0-#4 and the corresponding muting pattern directly, meaning that the five CSI-RS resources in the time instants having expanded CSI-RS measurements are signaled separately in a manner similar to the Rel. 10 CSI-RS configuration signaling.

(B.1) In a second technique (signaling technique B.1) a configuration and reporting signaling with reduced overhead can be used, such as by employing a CSI-RS port bitmap from the Rel. 10 ZeroPowerCSI-RS configuration. This can be denoted by "expanded CSI-RS configuration bitmap". In addition, a corresponding muting pattern is sent to the UE 10 as in the case of the first technique (A.1) above.

Another implementation embodiment is shown in Table 2 of FIG. 4, where the CSI-RS resource #1 is always transmitted by the LPNs at all CSI-RS transmission instants, and the extended measurements are based on CSI-RS resources #2-#5 in the respective LPNs. This implementation embodiment may have higher overhead than the embodiment of Table 1, but it has the benefit of being more backwards compatible, as the measurements for normal CSI reporting are possible from each of the subframes containing CSI-RS. In this embodiment the UE 10 measures the CSI based on the normal CSI-RS resources #0-#1 and the expanded CSI-RS resources #2-#5 of FIG. 5B in the expanded measurement subframes at the exemplary time instants t2 and t6. That is, the UE 10 measures both the expanded set and the baseline set of CSI-RS resources in these subframes. The UE 10 can report the regular full CSI report for CSI-RS resources #0-#1 separately from the potentially simplified CSI report for the second set of CSI-RS resources #2-#5.

In either embodiment the information obtained from making the expanded CSI measurements is reported by the UE 10 to the eNB 12.

The expanded CSI-RS measurement configuration and CSI measurements at the time instants t2 and t6 in Table 2 could be implemented in at least two different ways.

(A.2) In a first technique (signaling technique A.2) the UE 10 is signaled the additional configurations #2-#5 and the corresponding muting pattern directly, meaning that the four additional configurations and measurements are signaled separately in a manner similar to the Rel. 10 CSI-RS resource signaling.

(B.2) In a second technique (signaling technique B.2) a configuration and reporting signaling with reduced overhead can be used, such as by employing a CSI-RS port bitmap from the Rel. 10 ZeroPowerCSI-RS configuration. This can be denoted by "expanded CSI-RS configuration bitmap". In addition, a corresponding muting pattern is sent to the UE 10 as in case of the first technique (A.2) above.

It can be noted that for different UEs not all, but just a subset of the additional CSI-RS resources transmitted within the cell, can be configured for each specific UE by either the first technique (A.1)/(A.2) or the second technique (B.1)/(B.2).

A more detailed explanation of the second technique (B.1)/(B.2) is now provided.

First, reference can be made to 3GPP TS 36.211 V10.3.0 (2011-09) Technical Specification 3rd Generation Partnership Project; Technical Specification Group Radio Access Network; Evolved Universal Terrestrial Radio Access (E-UTRA); Physical Channels and Modulation (Release 10). As is explained in Section 6.10.5, CSI reference signals, for each bit set to one in the 16-bit bitmap ZeroPowerCSI-RS configured by higher layers, the UE shall assume zero transmission power for the resource elements corresponding to the four CSI reference signal column in Tables 6.10.5.2-1 and 6.10.5.2-2 of 3GPP TS 36.211 V10.3.0 for normal and extended cyclic prefix, respectively, except for resource elements that overlap with those for which the UE shall assume non-zero transmission power CSI-RS as configured by higher layers. The most significant bit corresponds to the lowest CSI reference signal configuration index and subsequent bits in the bitmap correspond to configurations with indices in increasing order.

In the embodiments of this invention the granularity of the expanded CSI-RS configuration and report may be the same as in the ZeroPowerCSI-RS bitmap, i.e., groups of four CSI-RS ports or a bitmap indicating each CSI-RS port as shown in FIGS. 5A and 5B for the cases in Table 1 and Table 2, respectively. There is also the possibility to have, for example, 40 bits for LTE FDD with a per-CSI-RS port indication.

In general, FIG. 5 shows a basic principle of the expanded CSI-RS configuration bitmap for Table 1 (FIG. 5A) for signaling method (B.1) and the additional configurations of Table 2 (FIG. 5B) for signaling method (B.2). Based on the expanded CSI-RS configuration bitmap the UE 10 estimates the channel/signal quality for the subset of CSI-RS resources and reports the results to the eNB 12.

Independent of the manner in which the expanded CSI measurement configurations are signaled to the UE 10 (technique (A.1)/(A.2) or technique (B.1)/(B.2) above), at the time instants t2 and t6 the UE 10 measures the channels toward the configured transmit points based on the expanded CSI-RS resources. For the second embodiment (according to signaling technique A2 or B2) the UE 10 can measure both, one with full CSI for the normal CSI-RS resources and one with a smaller CSI for the expanded CSI-RS resources. Based on the CSI measurements of the expanded CSI-RS resources, the UE 10 composes and signals a corresponding additional CSI report, which contains simplified CSI information compared to the regular CSI report. The eNB 12 is then aware of the signal strength of the CSI-RS antenna port groups and is therefore able to compensate the CQI reported by the UE 10 for the next reporting instances with the regular CSI-RS/muting patterns.

The measurement configuration and reporting can be divided into regular (compact) CSI feedback and a special (expanded) CSI feedback. Note that both measurements and reports are performed by the UE 10, but the expanded measurements are preferably performed less often (based on eNB 12 configuration) and potentially have a lower granularity CSI (as compared to regular CSI reports containing RI, PMI and CQI). For the expanded CSI-RS configuration of Table 2, the UE 10 may report the regular full CSI report for CSI-RS resources #0-#1, separately from the special CSI report for the second set of CSI-RS resources #2-#5.

The special, expanded CSI feedback configuration and report are novel elements that can be configured by multiple separate, independent CSI-RS resource configurations as in technique (A.1)/(A.2) or by an "expanded bitmap" as indicated in technique (B.1)/(B.2) for all options.

Figure 6A:
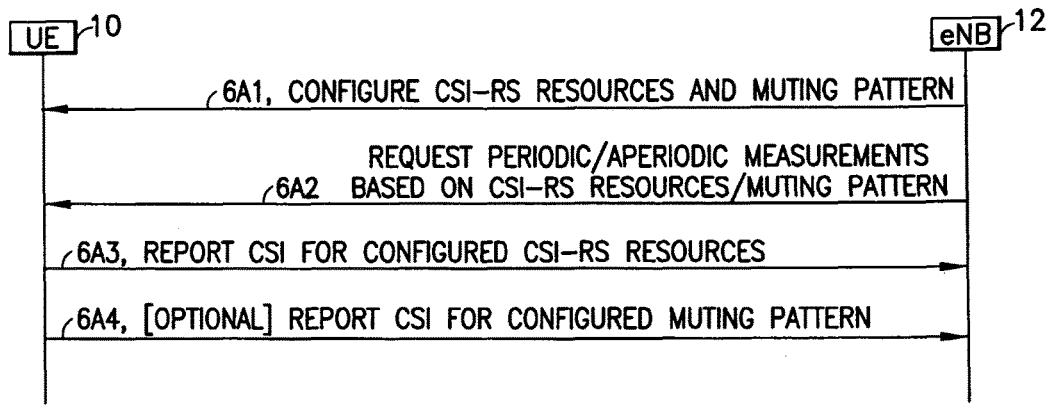
FIGS. 6A and 6B, collectively referred to as FIG. 6, show message flows, where
Figure 6B:
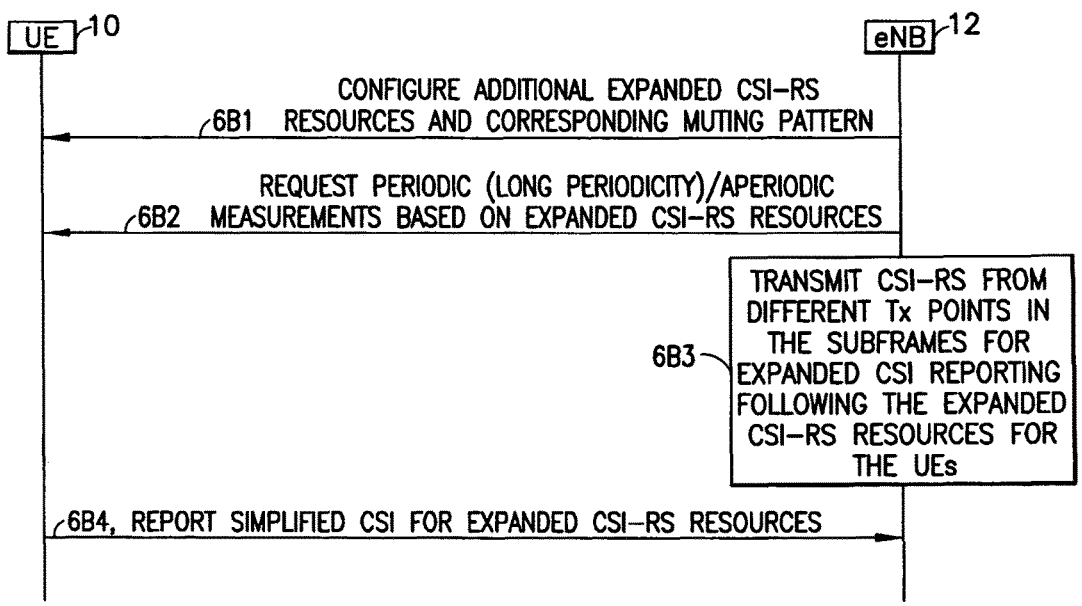

FIG. 6A shows a conventional message flow in accordance with LTE Rel-10/11 operation, while FIG. 6B shows a message flow in accordance with measurement configurations and reporting in accordance with this invention.

In the conventional procedure of FIG. 6A at 6A1 the eNB 12 configures one (in Rel-10) or multiple (as already agreed to in Rel-11) CSI-RS resources and muting patterns and signals this information to the UE 10. At 6A2 the eNB 12 requests periodic/aperiodic measurements based on the configured CSI-RS resources. At 6A3 the UE 10 makes the measurements and signals a CSI report to the eNB 12 for the configured CSI-RS resources. At 6A4 there is an optional operation of the UE 10 reporting the CSI for the configured muting pattern.

In the procedure of FIG. 6B, in accordance with the exemplary embodiments of this invention, at 6B1 the eNB 12 configures additional expanded CSI-RS resources and corresponding muting patterns and signals this information to the UE 10. At 6B2 the eNB 12 requests periodic (long periodicity)/aperiodic measurements based on the expanded CSI-RS resources. At 6B3 there is a transmission of CSI-RS from different TPs in those subframes for the expanded CSI reporting in accordance with the expanded CSI-RS resources for the UEs 10. At 6B4 the UE 10 signals a simplified CSI report to the eNB 12 for the expanded CSI-RS resources.

The following discussion focuses on the novel measurement and reporting procedures, and the inter-relationship with the conventional (Rel.-10) measurement and reporting. The measurement configuration and reporting in accordance with this invention can be considered to comprise the following logical steps:

(Step 1) The eNB 12 signals the expanded CSI-RS resource configuration(s) to the UE 10 to be used for the expanded CSI measurements either using technique A or technique B (expanded bitmap) as described above. In this Step 1 the eNB 12 can be considered as configuring by signaling the CSI-RS resource configuration to the UE 10. This corresponds to 6B1 in FIG. 6B.

(Step 2) The eNB 12 requests a report from the UE 10 concerning the channel quality of the different CSI-RS resources, or individual resources indicated by the expanded CSI-RS resource configuration(s). The channel quality can be a simplified version or a normal, regular CSI version. This corresponds to 6B2 in FIG. 6B.

It should be noted that the eNB 12 needs to carefully coordinate the subframes where the special CSI-RS muting pattern should be used by the UEs 10. This is important because the eNB 12 may need to map the different transmission points to different CSI-RS resources during those particular subframes, and adapt the PDSCH muting by the CSI-RS muting configurations accordingly, as indicated in Table 1 (FIG. 4).

The construction of the UE generated report based on the expanded CSI-RS resources can be similar to the report described in copending U.S. patent application Ser. No. 13/066,227, filed Apr. 8, 2011, Reference Signal Port Discovery Involving Transmission Points", Klaus Hugl, Cássio Ribeiro and Timo Lunttila, incorporated by reference herein. These are repeated here for convenience (Steps 3-6 below).

Step 3: The UE 10 measures and determines the channel quality of the individual CSI-RS resources (for the signaling technique (B.1)/(B.2) each resource contains one or several CSI-RS ports as indicated by the "expanded CSI-RS configuration pattern") or the individual CSI-RS resources (for signaling technique (A.1)/(A.2)).The definition of channel quality in this context may comprise, for example: average received CSI-RS power over the CSI-RS resource within the reporting granularity, average received SINR, or projected data throughput (similar to the CQI definition in LIE).

Step 4: The UE 10 reports the outcome of the measurement to the eNB 12. The reporting may be implemented using, e.g., Layer 1 signaling similar to the CSI measurements, or via MAC procedures as is the case of, e.g., RSRP/RSRQ measurements in LIE. Different reporting granularities/information can be considered. As non-limiting examples, a bitmap of the strongest CSI-RS ports (or resources) is reported back to the eNodeB; or an indication of several CSI-RS ports (or resources) and the related qualities. For example, an indication of the strongest CSI-RS resource, the quality of the strongest CSI-RS resource, an indication of weaker CSI-RS resources, and the relative quality of the weaker CSI-RS resources as compared to the best resource.

The eNB 12 may impose certain measurement restrictions on the UE 10 in order to guide the UE 10 on how to construct the final report. For example, the selection can be based on the n strongest/best CSI-RS ports or resources depending on the related reporting granularity. The value of n can be set by the eNB 12 or by higher layer signaling. Thus the UE 10 will report exactly the n strongest/best CSI-RS ports or resources. As another example, the eNB 12 can guide the UE 10 to take into account a relative quality/performance measure compared to the best quality/performance CSI-RS port or resource.

(Step 5) The eNB 12 receives the report from the UE 10 and determines the UE 10 specific CoMP collaboration set and the transmission mode. That is, it decides which transmission points are transmitting PDSCH to a particular UE 10, and it is able to apply CQI compensation for the LPNs sharing the same CSI-RS resource for normal, compact CSI-RS reporting based on the received measurement reports.

It should be noted that the eNB 12 can trigger the report request in Step 2 regularly in order to obtain longer-term information of the best possible CoMP collaboration set for single-cell ID CoMP operations, and at the same time reduce the overhead due to multiple CSI-RS resources in the LPNs.

As was noted previously, one possible approach is to use different CSI-RS resources and configurations for each individual TP 130 in a cell. However, this alternative implies a maximum CSI-RS overhead. Also, in certain cases (coherent joint transmission) combining of these reports at the eNB 12 may lead to suboptimal performance due to quantization of the individual reports. The use of the embodiments of this invention results in reduced overhead and a more straightforward utilization of coherent JT possibilities for those UEs 10 that would benefit from it.

The exemplary embodiments of this invention provide in one aspect thereof a definition of a set of reused CSI-RS resources, for example among LPNs in intra-cell CoMP, and further define separate CSI-RS resources for each transmission point for sporadic (less frequent) separate measurements. The exemplary embodiments further provide a technique to arrange the sporadic separate measurements and combine the regular CSI-RS measurements and sporadic separate measurements, and possibly (optionally) taking the sporadic measurements into account in an appropriate CQI correction/adjustment (if required).

It should be noted that in general the reuse of the CSI-RS resources can apply to any number of network nodes, and can apply as well even to network nodes having different cell-IDs.

In the conventional approach the eNB 12 can reconfigure the UE-specific CSI-RS resource via RRC signaling. In accordance with aspects of this invention the eNB 12 can configure two kinds of CSI-RS resources, i.e., the secondary resource configuration is introduced to reduce the signaling needed compared to frequent CSI-RS resource reconfiguration. The secondary CSI-RS resource configuration has a longer periodicity, e.g., a multiple of 5 ms or 10 ms. The longer, less seldom reported CQI measurement information can be used by the eNB 12 to select the TP (or at least determine which TP(s) are close to the UE 10) and enable CQI compensation. The longer CSI periodicity is used for enabling a simpler CSI measurement to be made and reported by the UE 10, enabling the eNB 12 to determine the dominant TPs for the UE 10 and some coarse CQI compensation. Note in this regard that the CQI compensation and dominant TPs would be used in the actual transmission. However, they need not necessarily be used in, for example, determining the precoder for the actual transmission.

Based on the foregoing it should be apparent that the exemplary embodiments of this invention provide a method, apparatus and computer program(s) to enhance the operation of intra-cell CoMP.

In accordance with an aspect of this invention a first set of CSI-RS resources are assigned to TPs 130 and a second set of CSI-RS resources are assigned to the TPs 130, where the first set is smaller than the second set. The assigned sets of CSI-RS resources are transmitted at given OFDM symbols and at specific subcarriers. In a non-limiting embodiment the first set comprises one common CSI-RS resource for all TPs 130, and the second set comprises a single CSI-RS resource per TP 130. At least one TP 130 can use the same CSI-RS resource in both sets. In a non-limiting example a CSI-RS resource of the first set could be transmitted, e.g., every 5 ms, while a CSI-RS resource of the second set could be transmitted, e.g., every 20 ms.

In accordance with an aspect of this invention the first set of CSI-RS resources includes a common CSI-RS resource that is shared by at least some of the plurality of transmission points, and the second set of CSI-RS resources comprises a single CSI-RS resource per transmission point that is to be uniquely identifiable by the user equipment (i.e., a logical, identifiable transmission point as viewed by the UE 10). The separate CSI-RS resources define which transmission points are to be uniquely identifiable from the UE receiver point of view. Note in this regard that it is possible to configure the system such that the LPNs (physical transmission points) may be divided into several groups. In the first set of CSI-RS resources the LPNs could share the common CSI-RS resource, while in the second set of CSI-RS resources the groups of LPNs could have a separate CSI-RS resource per group. Therefore, the groups could form (logically identifiable) transmission points from the perspective of UE 10 (while in reality there could be more physical transmission points). In the exemplary embodiments described in FIG. 4 each LPN would form its own group with respect to the second set of CSI-RS resources. Furthermore, it is possible to apply the teachings of this invention also in a group of macro cells, as long as the set of transmission points that are sharing a CSI-RS resource can be configured to transmit the same CSI-RS resource.

As should be apparent based on the foregoing description certain aspects of this invention can be performed at an evolved NodeB in a coordinated multi-point (CoMP) wireless communication system. The evolved NodeB can use a received channel state information report for at least defining a CoMP transmission format for a user equipment. The CoMP transmission format can include, for example, a selection of the involved CoMP transmission points, transmission rank/number of transmission layers, precoding, and transport block size (as non-limiting examples). The evolved NodeB can also use a received channel state information report for at least making a scheduling decision, such as a scheduling decision that comprises, as non-limiting examples, the use of a non-CoMP transmission, blanking, and joint transmission and the relevant parameters of the corresponding transmission format. The evolved NodeB can also use, if desired, a received channel state information report in deriving a compensation value to be used for compensating the reported channel quality indication value in order for it to reflect the effect that a selected CoMP transmission format has on the interference experienced at the user equipment.

Figure 8:
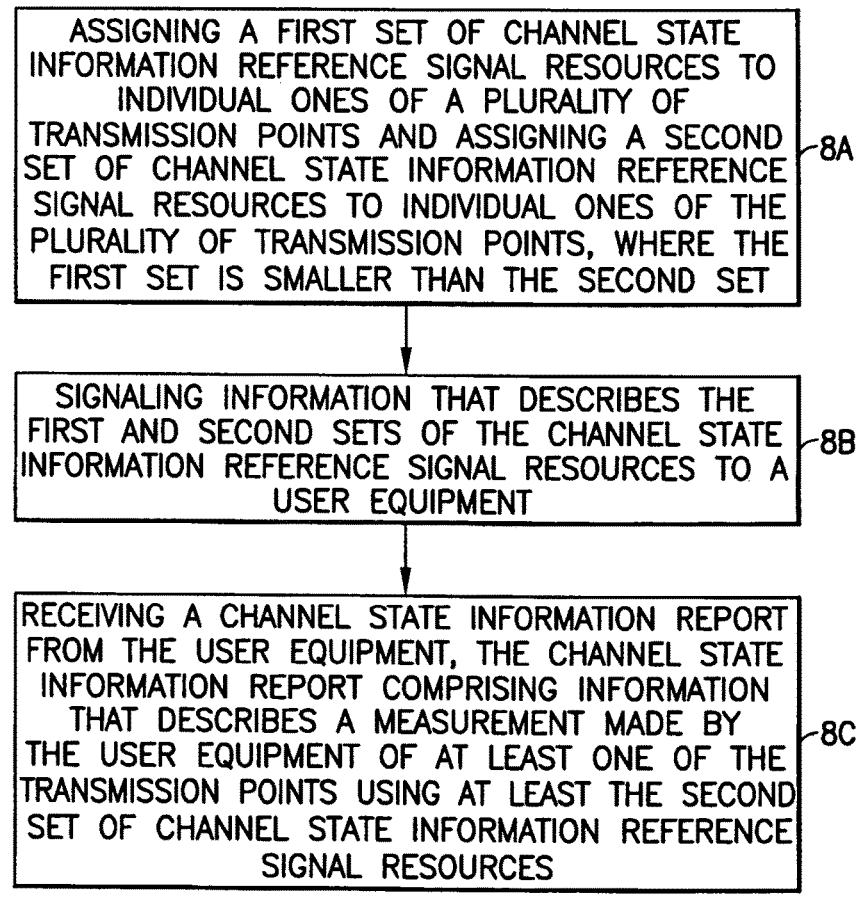
FIGS. 8 and 9 are each a logic flow diagram illustrating the operation of a method, and a result of execution of computer program instructions embodied on a computer readable medium, in accordance with the exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 8A, a step of assigning a first set of channel state information reference signal resources to individual ones of a plurality of transmission points and assigning a second set of channel state information reference signal resources to individual ones of the plurality of transmission points, where the first set is smaller than the second set. At Block 8B there is a step of signaling information that describes the first and second sets of the channel state information reference signal resources to a user equipment. At Block 8C there is a step of receiving a channel state information report from the user equipment, the channel state information report comprising information that describes a measurement made by the user equipment of at least one of the transmission points using at least the second set of channel state information reference signals resources.

Figure 9:
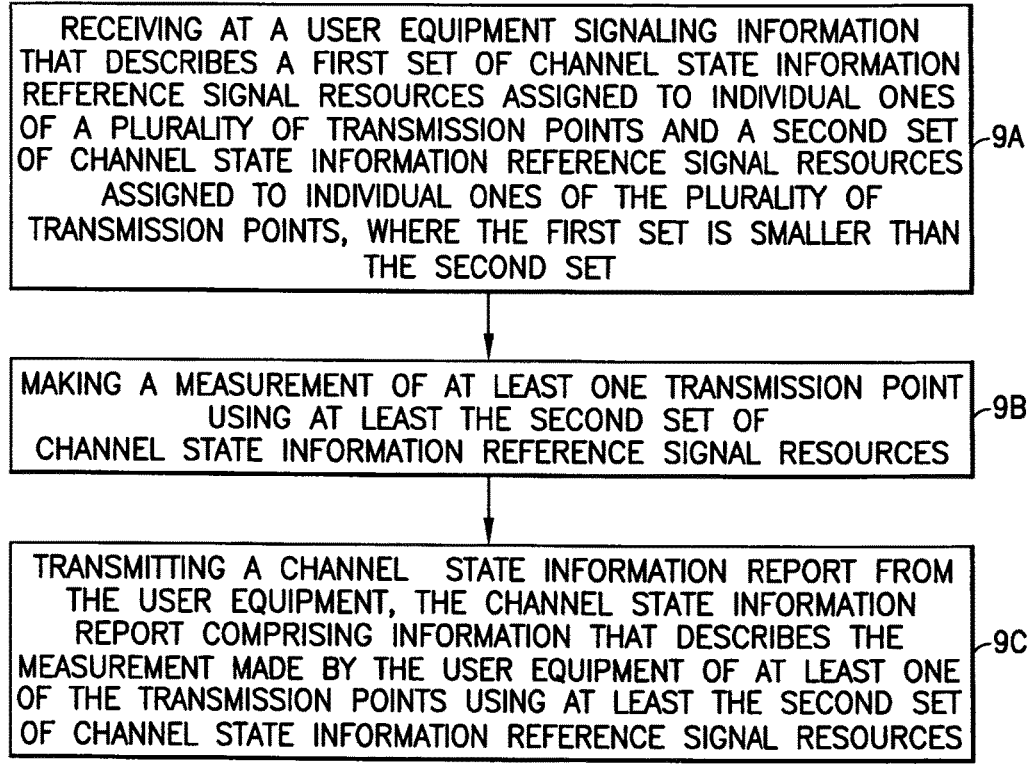

FIG. 9 is a logic flow diagram that illustrates the operation of a method, and a result of execution of computer program instructions, further in accordance with the exemplary embodiments of this invention. In accordance with these exemplary embodiments a method performs, at Block 9A, a step of receiving at a user equipment signaling information that is descriptive of a first set of channel state information reference signal resources assigned to individual ones of a plurality of transmission points and a second set of channel state information reference signal resources assigned to individual ones of the plurality of transmission points, where the first set is smaller than the second set. At Block 9B there is a step of making a measurement of at least one transmission point using at least the second set of channel state information reference signal resources. At Block 9C there is a step of transmitting a channel state information report from the user equipment, the channel state information report comprising information that describes the measurement made by the user equipment of at least one of the transmission points using at least the second set of channel state information reference signal resources.

The various blocks shown in FIGS. 8 and 9 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings.

However, any and all modifications will still fall within the scope of the non-limiting and exemplary embodiments of this invention.

For example, while the exemplary embodiments have been described above in the context of the UTRAN LTE-A system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters are not intended to be limiting in any respect, as these parameters may be identified by any suitable names. Further, the various names assigned to different channels (e.g., PUCCH, PUCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    assigning a first set of channel state information reference signal resources to individual ones of a plurality of transmission points that are located within a cell and assigning a second set of channel state information reference signal resources to individual ones of the plurality of transmission points located within the cell, where the first set is equal to or smaller than the second set;
    signaling information that describes at least one of the first and the second sets of the channel state information reference signal resources to a user equipment;
    receiving a channel state information report from the user equipment, the channel state information report comprising information that describes a measurement made by the user equipment of at least one of the plurality of transmission points using a configuration based on the first set of channel state information reference signal resources, and alternatively the second set of channel state information reference signal resources, and alternatively both the first set of channel state information reference signal resources and the second set of channel state information reference signal resources, where the measurement made using the second set of channel state information reference signal resources is a simplified measurement occurring less frequently than a measurement corresponding to the first set of channel state information reference signal resources, where the simplified measurement is simplified compared to the measurement corresponding to the first set of channel state information reference signal resources; and
    triggering the user equipment to make the measurement.

2. The method of claim 1, where the assigned sets of channel state information reference signal resources are transmitted by the plurality of transmission points at certain orthogonal frequency division multiplex symbols in certain subcarriers.

3. The method as in claim 1, where the first set of channel state information reference signal resources comprises at least one common channel state information reference signal resource shared by the plurality of transmission points, and where the second set of channel state information reference signal resources comprises a single unique channel state information reference signal resource per transmission point.

4. The method of claim 3, where during a transmission an individual one of the plurality of transmission points transmits only the channel state information reference signal resource of the second set.

5. The method of claim 3, where during a transmission an individual one of the plurality of transmission points transmits a channel state information reference signal resource of the first set and also transmits the single channel state information reference signal resource of the second set.

6. The method as in claim 1, where signaling the information that describes at least one of the first and the second sets of the channel state information reference signal resources also signals a muting pattern corresponding to certain channel state information reference signal resources.

7. The method as in claim 1, where receiving the channel state information report from the user equipment based on the measurement using the second set of channel state information reference signal resources occurs less frequently than receiving a channel state information report from the user equipment based on a measurement using the first set of channel state information reference signal resources.

8. The method of claim 1, where signaling the information that describes the second set of channel state information reference signal resources is done in the form of a bit map.

9. The method as in claim 1, executed by an evolved NodeB in a coordinated multi-point wireless communication system, and further comprising using the received channel state information report for at least one of defining a coordinated multi-point transmission format for the user equipment and making a scheduling decision for the user equipment.

10. An apparatus, comprising:
    at least one data processor; and
    at least one memory including computer program code, where the at least one memory and computer program code are configured, with the at least one data processor, to cause the apparatus at least to
    assign a first set of channel state information reference signal resources to individual ones of a plurality of transmission points that are located within a cell and to assign a second set of channel state information reference signal resources to individual ones of the plurality of transmission points located within the cell, where the first set is equal to or smaller than the second set;
    signal information that describes at least one of the first and the second sets of the channel state information reference signal resources to a user equipment; and
    receive a channel state information report from the user equipment, the channel state information report comprising information that describes a measurement made by the user equipment of at least one of the plurality of transmission points using a configuration based on the first set of channel state information reference signal resources, and alternatively the second set of channel state information reference signal resources, and alternatively both the first set of channel state information reference signal resources and the second set of channel state information reference signal resources;
    where the apparatus is configured to trigger the user equipment to make the measurement using the second set of channel state information reference signal resources,
    where the measurement made using the second set of channel state information reference signal resources is a simplified measurement occurring less frequently than a measurement made using the first set of channel state information reference signal resources.

11. The apparatus of claim 10, where the assigned sets of channel state information reference signal resources are transmitted by the plurality of transmission points at certain orthogonal frequency division multiplex symbols in certain subcarriers.

12. The apparatus as in claim 10, where the first set of channel state information reference signal resources comprises at least one common channel state information reference signal resource shared by a plurality of transmission points, and where the second set of channel state information reference signal resources comprises a single unique channel state information reference signal resource per transmission point.

13. The apparatus of claim 12, where during a transmission an individual one of the plurality of transmission points transmits only the single channel state information reference signal resource of the second set.

14. The apparatus of claim 12, where during a transmission an individual one of the plurality of transmission points transmits a channel state information reference signal resource of the first set and also transmits the single channel state information reference signal resource of the second set.

15. The apparatus of claim 10, where the signaled information that describes at least one of the first and second sets of the channel state information reference signal resources also signals a muting pattern corresponding to certain channel state information reference signal resources.

16. The apparatus according to claim 10, where the received channel state information report when using the second set of channel state information reference signal resources is a simplified report as compared to a report received when using the first set of channel state information reference signal resources, and where receiving a channel state information report from the user equipment based on the measurement using the second set of channel state information reference signal resources occurs less frequently than receiving channel state information report from the user equipment based on a measurement using the first set of channel state information reference signal resources.

17. A method, comprising:
receiving at a user equipment signaling information that is descriptive of a first set of channel state information reference signal resources assigned to individual ones of a plurality of transmission points that are located within a cell and a second set of channel state information reference signal resources assigned to individual ones of the plurality of transmission points located within the cell, where the first set is equal to or smaller than the second set;
making a measurement of at least one of the plurality of transmission points using at least one of the first and the second set of channel state information reference signal resources; and
transmitting a channel state information report from the user equipment, the channel state information report comprising information that describes the measurement made by the user equipment of the at least one of the plurality of transmission points using a configuration based on the first set of channel state information reference signal resources, and alternatively the second set of channel state information reference signal resources, and alternatively both the first set of channel state information reference signal resources and the second set of channel state information reference signal resources;
where the channel state information report comprises a simplified channel state information report corresponding to the second set of channel state information reference signal resources that occurs less frequently than a channel state information report corresponding to the first set of channel state information reference signal resources, where the simplified channel state information report is simplified compared to the channel state information report corresponding to the first set of channel state information reference signal resources.

18. The method as claim 17, where the first set of channel state information reference signal resources includes a common channel state information reference signal resource that is shared by at least some of the plurality of transmission points, and where the second set of channel state information reference signal resources comprises a single unique channel state information reference signal resource per transmission point.

19. An apparatus, comprising:
at least one data processor; and
at least one memory including computer program code, where the at least one memory and computer program code are configured, with the at least one data processor, to cause the apparatus at least to
receive at a user equipment signaling information that is descriptive of a first set of channel state information reference signal resources assigned to individual ones of a plurality of transmission points that are located within a cell and a second set of channel state information reference signal resources assigned to individual ones of the plurality of transmission points located within the cell, where the first set is equal to or smaller than the second set;
make a measurement of at least one of the plurality of transmission points using at least one of the first and the second set of channel state information reference signal resources; and
transmit a channel state information report from the user equipment, the channel state information report comprising information that describes the measurement made by the user equipment of the at least one of the plurality of transmission points using a configuration based on the first set of channel state information reference signal resources, and alternatively the second set of channel state information reference signal resources, and alternatively both the first set of channel state information reference signal resources and the second set of channel state information reference signal resources;
where the channel state information report comprises a simplified channel state information report corresponding to the second set of channel state information reference signal resources that occurs less frequently than a channel state information report corresponding to the first set of channel state information reference signal resources.

20. The apparatus according to claim 19, where the apparatus transmits the channel state information report corresponding to the second set of channel state information reference signal resources less frequently than it transmits the channel state information report corresponding to the first set of channel state information reference signal resources.

21. The apparatus of claim 19, where the first set of channel state information reference signal resources includes a common channel state information reference signal resource that is shared by at least some of the plurality of transmission points, and where the second set of channel state information reference signal resources comprises a single unique channel state information reference signal resource per transmission point, and where the user equipment receives from a transmission point only the single channel state information reference signal resource of the second set, or where the user equipment receives from a transmission point a channel state information reference signal resource of the first set and also the channel state information reference signal resource of the second set.

22. An apparatus, comprising:

at least one data processor; and at least one memory including computer program code, where the at least one memory and computer program code are configured, with the at least one data processor, to cause the apparatus at least to assign a first set of channel state information reference signal resources to individual ones of a plurality of transmission points that are located within a cell and assigning a second set of channel state information reference signal resources to individual ones of the plurality of transmission points located within the cell, where the first set is equal to or smaller than the second set;

signal information that describes at least one of the first and the second sets of the channel state information reference signal resources to a user equipment;

receive a channel state information report from the user equipment, the channel state information report comprising information that describes a measurement made by the user equipment of at least one of the plurality of transmission points using a configuration based on the first set of channel state information reference signal resources, and alternatively the second set of channel state information reference signal resources, and alternatively both the first set of channel state information reference signal resources and the second set of channel state information reference signal resources; and trigger the user equipment to make the measurement using the second set of channel state information reference signal resources;

where the measurement made using the second set of channel state information reference signal resources is a simplified measurement occurring less frequently than a measurement made using the first set of channel state information reference signal resources; and where the first set of channel state information reference signal resources comprises at least one common channel state information reference signal resource shared by the plurality of transmission points, and where the second set of channel state information reference signal resources comprises a single unique channel state information reference signal resource per transmission point.

23. The apparatus of claim 10, wherein the first set is smaller than the second set.

* * * * *